US008392720B2

(12) United States Patent
Castaldi et al.

(10) Patent No.: US 8,392,720 B2
(45) Date of Patent: *Mar. 5, 2013

(54) SECURITY OF DATA OVER A NETWORK

(75) Inventors: Joseph Castaldi, West Linn, OR (US); Robin F. Hoeye, Canby, OR (US); Jeff Glickman, Las Vegas, NV (US)

(73) Assignee: Seiko Epson Corporation, Suwa-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,935

(22) Filed: Apr. 28, 2011

(65) Prior Publication Data

US 2011/0202770 A1 Aug. 18, 2011

Related U.S. Application Data

(63) Continuation of application No. 10/860,561, filed on Jun. 2, 2004, now Pat. No. 7,945,785.

(60) Provisional application No. 60/475,566, filed on Jun. 2, 2003.

(51) Int. Cl.
*G06F 21/00* (2006.01)

(52) U.S. Cl. ..... 713/183; 713/150; 713/182; 455/456.1; 705/72; 726/1; 726/22; 726/26; 380/200; 380/201

(58) Field of Classification Search .................. 713/150, 713/183, 182, 168; 705/72; 726/1, 22, 26; 380/200, 201; 455/456.1
See application file for complete search history.

(56) References Cited

U.S. PATENT DOCUMENTS

| 6,860,609 | B2 | 3/2005 | Olson et al. |
|---|---|---|---|
| 6,862,103 | B1 | 3/2005 | Miura et al. |
| 7,202,884 | B1 | 4/2007 | Barraclough |
| 7,293,071 | B2 | 11/2007 | Sato et al. |
| 7,296,161 | B1 | 11/2007 | Wakao et al. |
| 7,447,906 | B2 | 11/2008 | Kubota |
| 2001/0033404 | A1 | 10/2001 | Escobosa et al. |
| 2002/0002703 | A1 | 1/2002 | Baentsch et al. |
| 2002/0004785 | A1 | 1/2002 | Schull |
| 2002/0012433 | A1 | 1/2002 | Haverinen et al. |
| 2002/0025042 | A1* | 2/2002 | Saito ............................ 380/258 |
| 2002/0108108 | A1 | 8/2002 | Akaiwa et al. |
| 2003/0017846 | A1 | 1/2003 | Estevez et al. |
| 2003/0051139 | A1 | 3/2003 | Kubota |
| 2003/0070099 | A1 | 4/2003 | Schwartz et al. |
| 2003/0135764 | A1 | 7/2003 | Lu |
| 2003/0146907 | A1 | 8/2003 | Boals et al. |
| 2003/0191938 | A1 | 10/2003 | Woods et al. |

(Continued)

FOREIGN PATENT DOCUMENTS

| WO | 02/102054 | 12/2002 |
|---|---|---|
| WO | 03/005145 | 1/2003 |

OTHER PUBLICATIONS

European Patent Office, Supplementary European Search Report of EP 04 75 4184, Jun. 5, 2008, EPO.

(Continued)

*Primary Examiner* — Christian LaForgia
*Assistant Examiner* — Roderick Tolentino
(74) *Attorney, Agent, or Firm* — Oliff & Berridge, PLC

(57) ABSTRACT

A method for securing data transmitted over a network to an image display device. In one embodiment, the method may include identifying at least one image display device on the network, selecting the at least one image display device for transmission of data, activating a data protection process to generate locked data and transmitting the locked data to the image display device. The method may further include receiving a key to unlock the locked data such that the data is available to the image display device.

12 Claims, 7 Drawing Sheets

U.S. PATENT DOCUMENTS

| | | |
|---|---|---|
| 2003/0208753 A1 | 11/2003 | Corrigan et al. |
| 2003/0212639 A1 | 11/2003 | Cronce et al. |
| 2003/0221011 A1 | 11/2003 | Shitano |
| 2004/0003256 A1* | 1/2004 | Coffy et al. .................. 713/179 |
| 2004/0040035 A1 | 2/2004 | Carlucci et al. |
| 2004/0090466 A1* | 5/2004 | Loveria, III .................. 345/781 |
| 2004/0098281 A1 | 5/2004 | Chien et al. |
| 2004/0111601 A1 | 6/2004 | Racz |
| 2004/0139314 A1 | 7/2004 | Cook et al. |
| 2004/0224702 A1 | 11/2004 | Chaskar |

OTHER PUBLICATIONS

Pettelkau, Jeff. "Toshiba TDP-SW20 Wireless DLP Projector". Oct. 2004 [retrieved on Mar. 15, 2007]. Retrieved from the Internet: <URL: http://www.jiwire.com/toshiba-TDP-SW20-wireless-projector-photo-image-gallery.htm>.

* cited by examiner

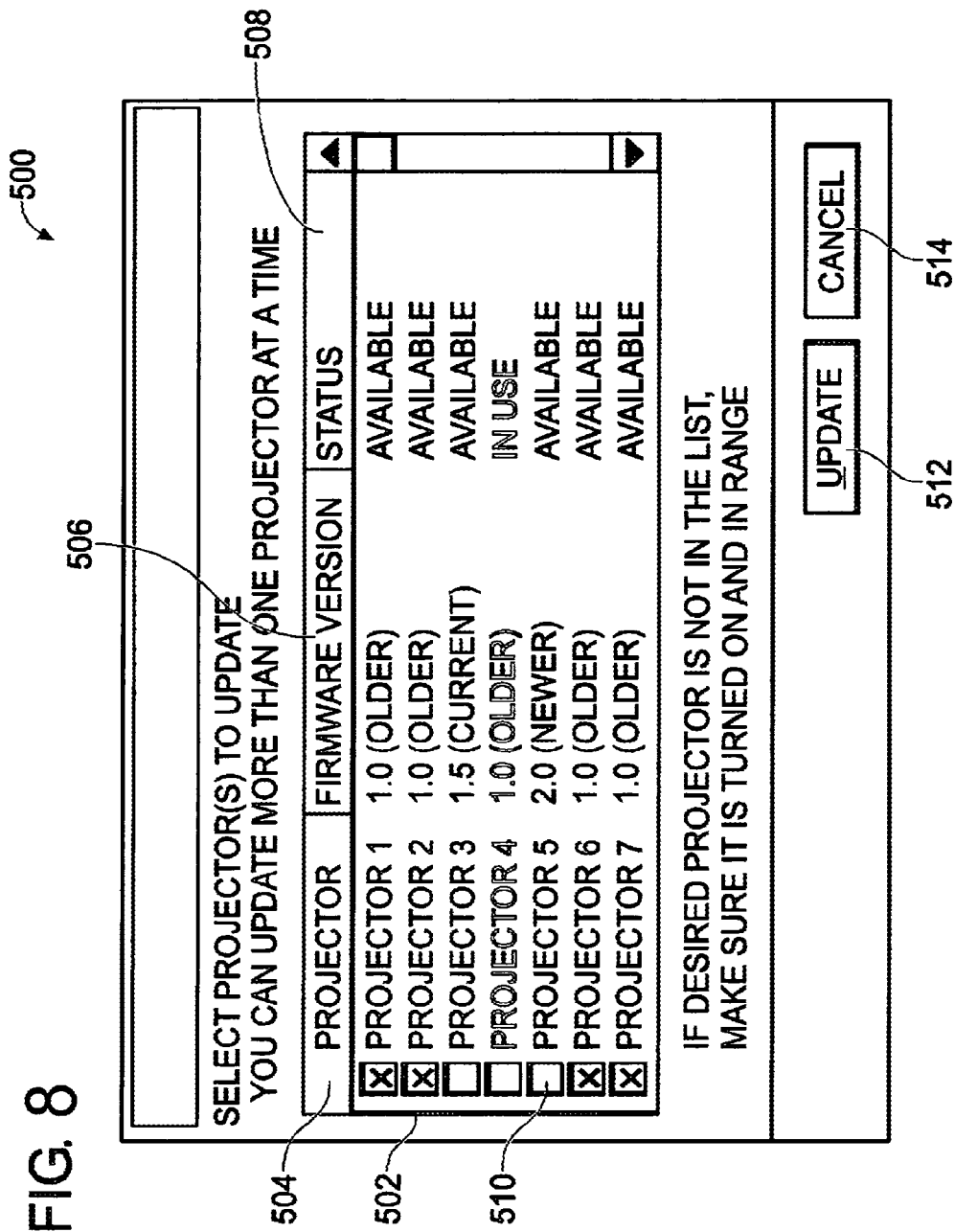

SECURITY OF DATA OVER A NETWORK

CROSS-REFERENCE TO RELATED APPLICATIONS

The present application claims priority under 35 U.S.C. §119 to U.S. Provisional Patent Application Ser. No. 60/475,566, which was filed on Jun. 2, 2003. The disclosure of that application is hereby incorporated by reference in its entirety for all purposes.

TECHNICAL FIELD

The present disclosure relates generally to transmission of data over a network, and more specifically to security of data during transmission to an image display device over a network.

BRIEF DESCRIPTION OF THE DRAWINGS

The disclosure is illustrated by way of example and not by way of limitation in the figures of the accompanying drawings, in which the like references indicate similar elements and in which:

FIG. 8 is a representative exemplary user interface window showing a plurality of projection devices that been located on a network for an upgrade.

DETAILED DESCRIPTION

Figure 1:
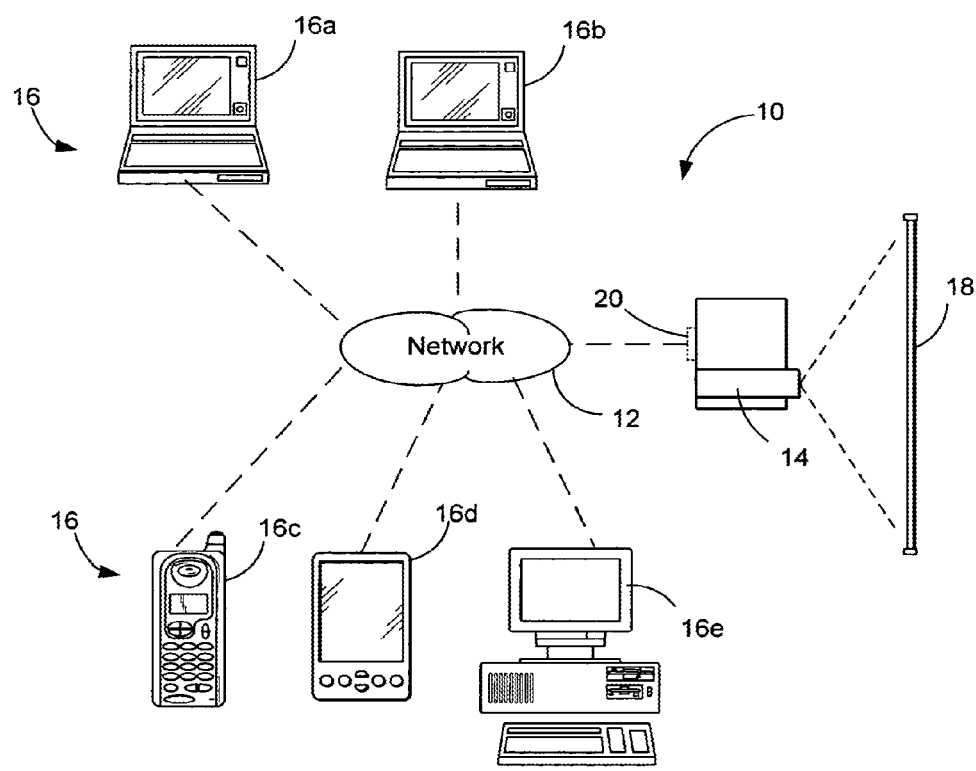
FIG. 1 is a schematic diagram of an image-processing and display system including a plurality of image sources and an exemplary image display device.

FIG. 1 shows, generally at 10, an exemplary image processing and display system. Image processing and display system 10 may include a network 12 to which one or more image display devices (also referred to as presenting devices) 14 and image sources 16 may be linked. Network 12 may be any suitable network, including, but not limited to, a public network, a private network, a local area network (LAN), a wireless LAN (WLAN), a wide area network (WAN), or any combination thereof.

Image display device 14 may be any suitable device configured to display an image. For example, image display device may be a projection device, such as digital image display device, a liquid crystal display (LCD) image display device, a digital light processing (DPL) image display device; a image display device; an image display device with a detachable image-rendering device 14b (described in more detail below in FIG. 2); a rear projection device; a front projection device; etc. It should be appreciated that although FIG. 1 illustrates only a single image display device 14 linked to network 12, additional image display devices may be linked to network 12 and be part of system 10.

Also linked to network 12 are images sources or computing devices 16. Image sources 16 may be any suitable computing device configured to transmit an image over network 12 to image display device 14. For example, in FIG. 1, exemplary image sources are shown, including laptop computers 16a, 16b, telephone 16c, personal digital assistant (PDA) or handheld computer 16d; a desktop computer 16e. Other exemplary image sources may include network servers, portable computing devices, administrative computing devices or servers, etc. It should be appreciated that such images sources are intended for illustrative purposes and any number or type of images sources and image display devices may compose network 12.

Briefly, image sources 16 may be configured to transmit data over the network 12 to a display device. Data, as used herein, includes any suitable transferable data, including image data, graphical data, images, graphics, presentations, programs, applications, etc. Data, in the form of image data, may be transmitted from image source 16 such that it may be displayed and/or projected onto a viewing surface, such as a screen or other suitable display surface, as indicated at 18.

Each image display device 14 may be configured to announce its presence over the network to image sources 16. Image sources 16 may likewise be configured to detect the announcements sent by each image display device 14. In this manner, each image display device 14 may communicate whether it is available for use (or not available for use) to a user of one of image sources 16. This may facilitate the use of image display devices 14 and image sources 16 in use environments having multiple image sources and display devices, including, but not limited to, academic and corporate settings.

Each image display device 14 may be configured to announce its presence over the network to image sources 16 in any suitable manner. For example, each image display device 14 may broadcast an announcement message over the network to all devices on the network. Image display devices 14 may also unicast the announcement message over network 12; i.e. send separate announcement messages to each image source 16 on the network. Further, in some embodiments, image display devices 14 and/or image sources may be configured to multicast an announcement message over network 12. Further such devices may be configured to receive a multicast message from other computing devices (e.g. another image display device, an image source, an administrative computing device, etc.) over the network.

Figure 2:
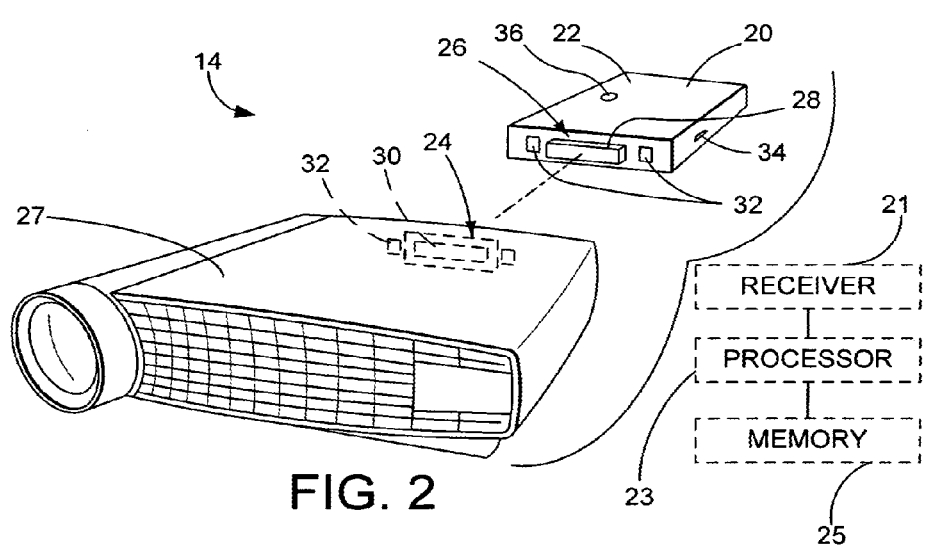
FIG. 2 is an exemplary image display device including an image-rendering device.

FIG. 2 illustrates an exemplary image display device or presenting device 14. Image display device 14 typically includes an image-rendering or image-transformation device 20 which may be integrated within or removably coupled to the image display device. Although described as removably coupled to image display device 14, such description is provided only for illustrative purposes. In some embodiments, selected functions and selected components of image-rendering device 20 may be integrally formed within image display device 14.

The combination image-rendering device and image display device may include a receiver 21, a processor 23 and memory 25. Receiver 21 may be any suitable receiver configured to receive data transmitted to the image-rendering device over the network. In some embodiments, receiver 21 may be a wireless receiver. Data received may be processed by processor 23 (e.g., decompressed or otherwise manipulated for display) and temporarily stored in memory 25 (e.g.

images stored in a buffer prior to display). In some embodiments, the data may be images which may be displayed on a viewing surface using image components 27 of image display device 14.

Briefly, in the exemplary embodiment, image-rendering device 20 may be operably coupled to, or otherwise operably associated with the image display device such that data is received by image-rendering device 20 and transferred from image-rendering device 20 to image display device 14. For example, the data may be transferred to image display device 14 for display or presentation on a projection or viewing surface. Thus, image-rendering device 20 may be adapted to receive data (e.g. images) from a plurality of different image sources (such as exemplary images sources 16 in FIG. 1) and automatically transmit received data to image display device 14 for projection or other use. Image-rendering device 20 may also be referred to herein as an "image-rendering module" or a "presenter module."

The depicted image-rendering device 20 may include a body 22. In some embodiments, body 22 may be configured to be selectively inserted at least partially within an attachment slot 24 in image display device 14. Specifically, body 22 may include an image display device connector 26. Image display device connector 26 may function to couple image-rendering device 20 to image display device 14. Image display device connector 26 may further function to transmit or transfer a projectable image to display device 14. As illustrated in FIG. 2, image display device connector 26 may include a plug 28 that is adapted to be received into a corresponding outlet 30 in image display device 14, permitting image-rendering device 20 to directly engage or plug into image display device 14. Attachment structures, including latches 32, projections, pins, tabs, braces, screws or other suitable supports, may be used to retain image-rendering device 20 within outlet 30. Alternatively, instead of an integral connector, image display device connector 26 may be attachable to image display device 14 using wires, such as via a cable and plug arrangement.

Image-rendering device 20 may include at least one image or data receiver (indicated at 21). In some embodiments, the data receiver may be configured to receive a plurality of different data transfer devices. Data transfer devices may enable image-rendering device 20 to receive images from multiple sources. A data transfer device may be a card, an expansion board, an adapter or other suitable device. For example, a data transfer device may be a network interface card, such as a wired network card, or a wireless network card (e.g. a wireless LAN card, such as IEEE 802.11a, 802.11b, 802.11g, 802.11x, a radio card, a Bluetooth radio card, a ZigBee radio, etc.). In one example, a network interface card may enable communication between device 20 and an independent source, e.g. image sources 16. This communication may allow an image or presentation stored on the image sources 16 to be transmitted to image-rendering device 20.

In some embodiments, image-rendering device 20 may include at least one peripheral device connector 34 on body 22. Peripheral device connector 34 may be configured to enable at least one peripheral device, such as a printer, a facsimile machine, a camera, a computing device, etc., to be operably linked to image-rendering device 20 to enable images to be transferred from a peripheral device to image display device 14 or vice versa. Peripheral connector 34 may be any suitable connector. For example, peripheral connector 34 may be a standard connector, such as a Universal Serial Bus (USB) port, IEEE 1394 port, parallel port, e.g. enhanced parallel port (EPP), extended capabilities port (ECP), etc. It should be noted that more than one peripheral connector may be provided on body 22.

Further, in some embodiments, image-rendering device 20 may also include an indicator 36, such as a light or light emitting diode (LED), which may be used for diagnostic functions. Alternatively, in some embodiments, the indicator 36 may be located on the image display device, such as in the example when image-rendering device 20 is internally disposed in image display device 14.

As described above, data may be transferred from an image source over a wireless or wired network (or combination thereof) to an image display device. In some embodiments, image-rendering device 20 may enable image display device 14 to have wireless receiving functions, such as by use of a wireless network card. Alternatively, in some embodiments, the wireless and/or wired network capability of image display device 12 may include such integrated functions within the unit itself.

The wireless network capabilities of image-rendering device 20 and/or image display device 14 may enable a plurality of users to alternatively wirelessly link to network and send images to an image device without individually having to manually couple their computer to an image display device. Additionally, as long as a user's computer device is capable of linking to the local area network using standard protocols and transferring data, the type and model of the computer linked to image display device 14 may be irrelevant. No adapters or cables are necessary for the wireless connection (although they could be used, if desired).

It should be appreciated that multiple image display devices 14 may be selectable by a user of image source 16. In some embodiments, image display device 14 may be configured to display the name of the image display device onto a display surface (such as via a splashette image). For example, image display device 14 may be configured to initially display the name of the image display device when the image display device is initially powered on. Such a display may enable a user to easily identify and select the proper image display device to which to connect their image source.

In some embodiments, the name of the image display device 14 to which an image source 16 is linked may be communicated to image source 16. For example, when a user connects to a network on which the image display device is located, the image display device may appear as an icon on the image source display and/or the image display device may be added to a list of image display devices to which the image source may be selectively connected. In this situation, the user may select the image display device from the list of image display devices to connect to a specific image display device. The user may confirm proper selection by viewing the name of the image display device as projected by the image display device.

Figure 3:
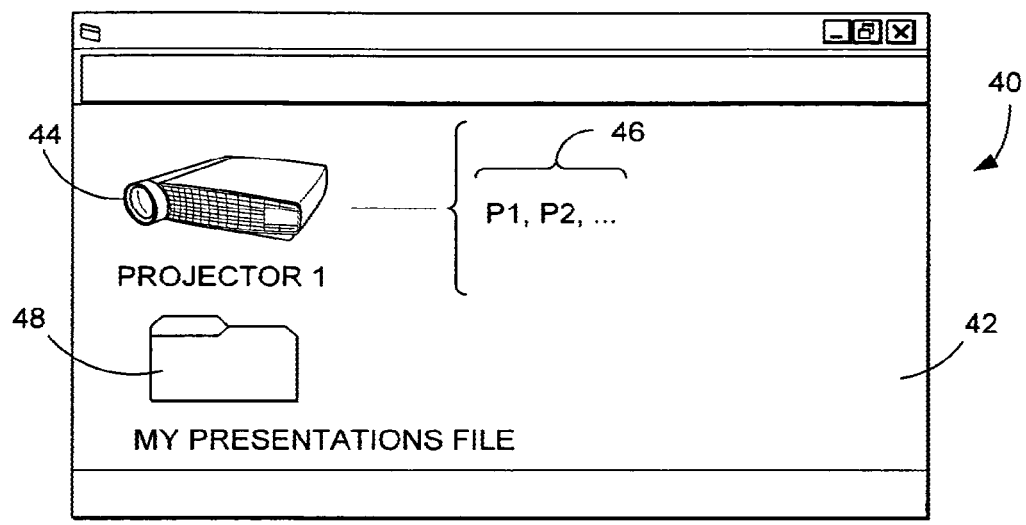
FIG. 3 is a representative exemplary user interface showing an image display device selection window.

An exemplary user interface is shown in FIG. 3. The exemplary user interface of FIG. 3 includes a selection window 40 for display on an image source display screen 42. It should be appreciated that any other suitable format to display available image display devices may be used. The user interface may include an image display device icon 44. Such an icon may be used to identify the image display device(s) that are currently available on the network. For example, and as shown in FIG. 3, "Image display device 1" is linked to the image source. Alternatively, a user may be able to select a different image display device from a list of image display device, as indicated at 46.

In some embodiments, the user interface also may include a presentations file 48 configured to allow a user to store presentations or images for display. For illustrative purposes the following example is provided. A user desires to wirelessly transmit a presentation to an image display device 14. The user identifies a select image display device. The name or identifier for the linked image display device may be broadcast to the user's computer (image source) indicating that the user can connect to the image display device and send images and/or presentations to the image display device. The user may then select a presentation from presentation file 48 and direct it to the linked image display device via an image display device icon 44. The user does not need to physically move his/her computer next to image display device, nor does the user have to plug adapters or cables into his/her computer to connect to the image display device (although the user can, if desired). Instead, the user simply connects to the wireless network and directs a desired image or presentation to the image display device. The user may remain seated the entire time and does not need to move to a position near the image display device when presenting (although the user may, if desired).

As discussed above, data and/or images may be transmitted from a user's computer to device 14 in many different formats. For example, an image file corresponding to the appearance of the display on the user's computer (screen shots or scrapes) may be sent to device 14. If desired, images may be compressed or otherwise manipulated such that they use a reduced amount of transmission bandwidth.

As noted above, a user interface may be used with the system to enable a user to perform various functions, such as transferring and projecting images to a selected image display device. While one example user interface was described above, various others may be used without departing from the scope of the disclosure.

Figure 4A:
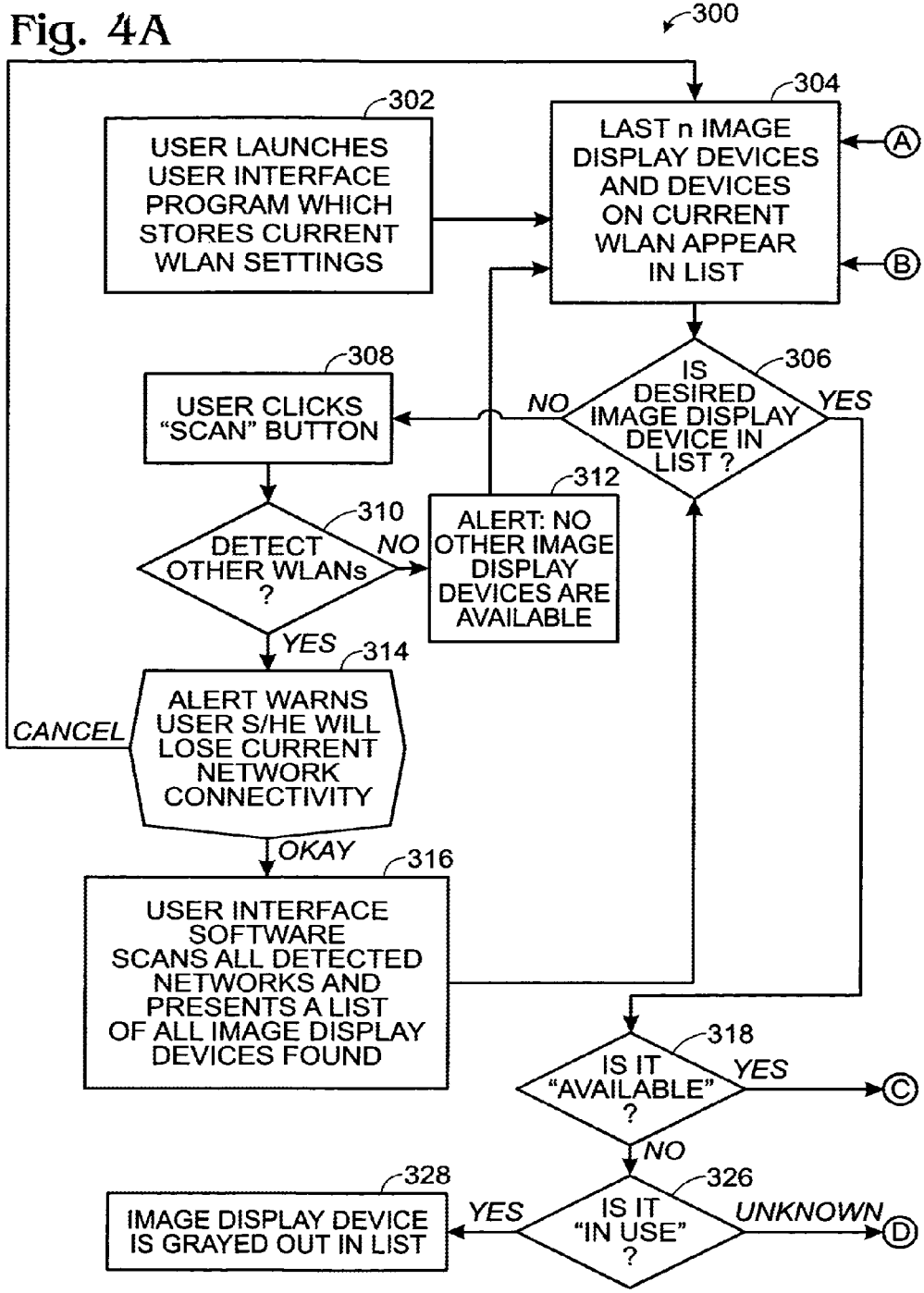
FIG. 4A is a flow diagram of an embodiment of a method of selecting, connecting to and sending data between one or more image display devices and one or more image sources.
Figure 4B:
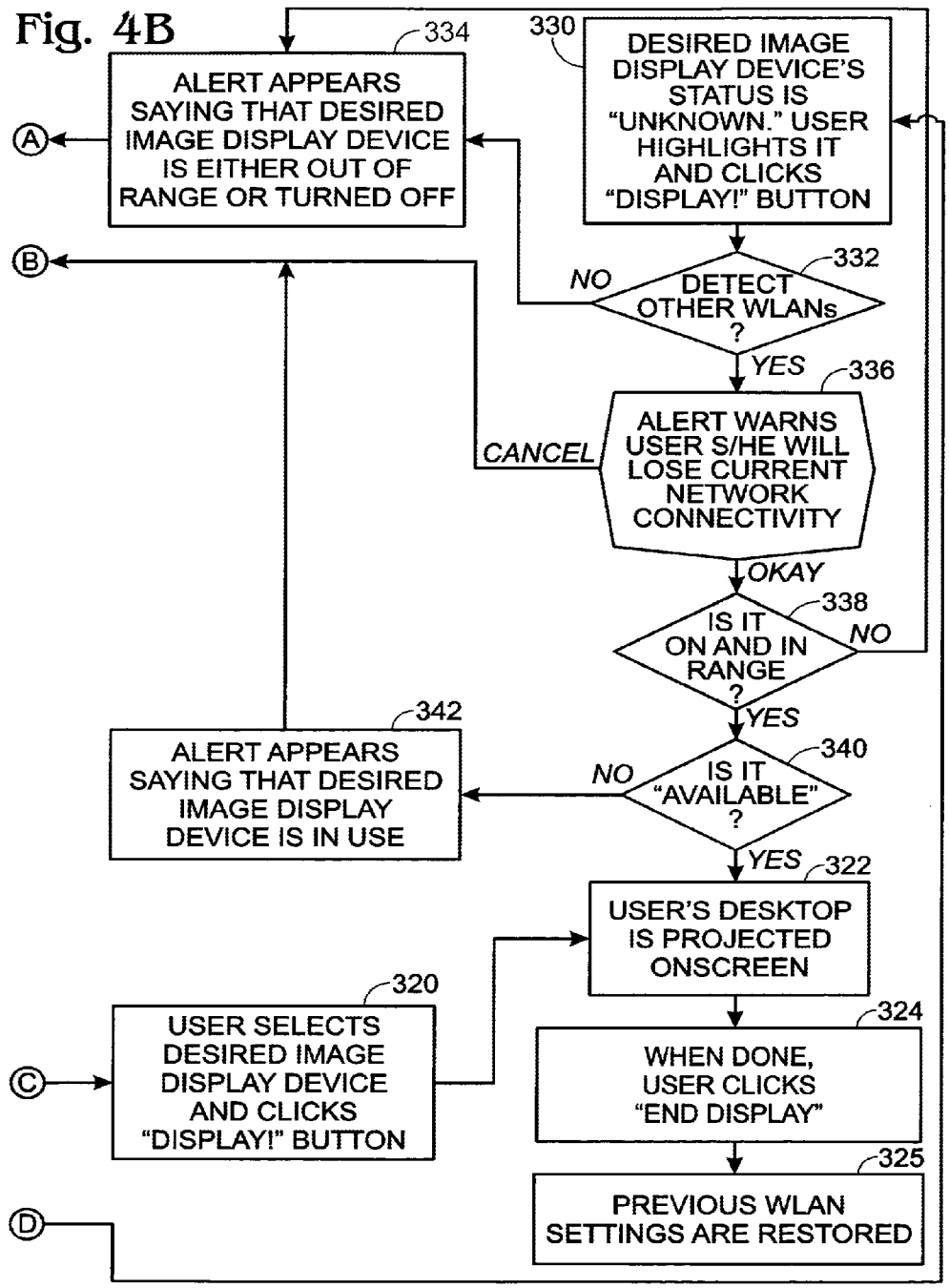
FIG. 4B is a continuation of the flow diagram of FIG. 4A.

Turning now to FIGS. 4A and 4B, a method of selecting, connecting to and sending data between image display devices and one or more image sources is shown. The method as shown generally at 300, provides an exemplary method of allowing a user to discover, select and connect to an image display device 14 over a network, such as a wireless local area network (WLAN). It will be appreciated that method 300 may employ the announcement and discovery methods and systems discussed earlier, however alternative methods may be used to identify and select one or more image display devices for transmission of data.

In the initial step of the exemplary method, a user launches a user interface program (at 302) on image source 16. Upon launch, the user interface program may detect and save the current WLAN settings on the user's computer (image source) so that the settings may be restored once the user has completed transmitting data to a selected image display device 14.

Next, at 304, the user interface program may display a list of image display devices 14 from which the user may select a desired image display device 14 with which to transmit data (e.g. display a presentation). The list of image display devices 14 may include the last N number of image display devices 14 accessed by the user's computer, or the image display devices 14 currently detected over the WLAN, or both.

Next, the user may examine the list of image display devices at 306 to determine whether a desired image display device 14 is on the list. If the desired image display device 14 is not shown on the list, then the desired image display device 14 may be connected to a WLAN other than the one to which the user's computer is currently connected. In this case, the user may select at 308 to scan to detect any other WLANs on which the desired image display device 14 may be located.

If no other WLANs are detected at 310, the user interface program may alert the user at 312 that no other WLANs are available. At this point, the user may return to the list of image display devices presented to the user at 304 to begin the image display device 14 selection process anew.

If, however, other WLANs are detected at 310, the user may desire to scan the other WLANs to continue searching for the desired image display device. Thus, at 312, the user is given the option of attempting this scan. If the user opts to perform the scan, the user may be alerted that the scan will result in the loss of connectivity to the current WLAN.

If the user decides at this time not to connect to scan the other WLANs, the user may cancel this operation and return to the list of image display devices presented at 304. On the other hand, if the user elects at this point to connect to another of the detected WLANs, the user interface program scans all detected WLANs at 316. Any image display devices discovered in this scan is then added to the list of image display devices presented to the user at 304, and the user may again examine the list at 306 for a desired image display device.

The list of image display devices presented to the user may include information regarding the status of each discovered image display device. For example, the list may show whether each listed image display device 14 is on the current WLAN or another WLAN, and/or whether each listed image display device 14 is currently in use.

Figure 5:
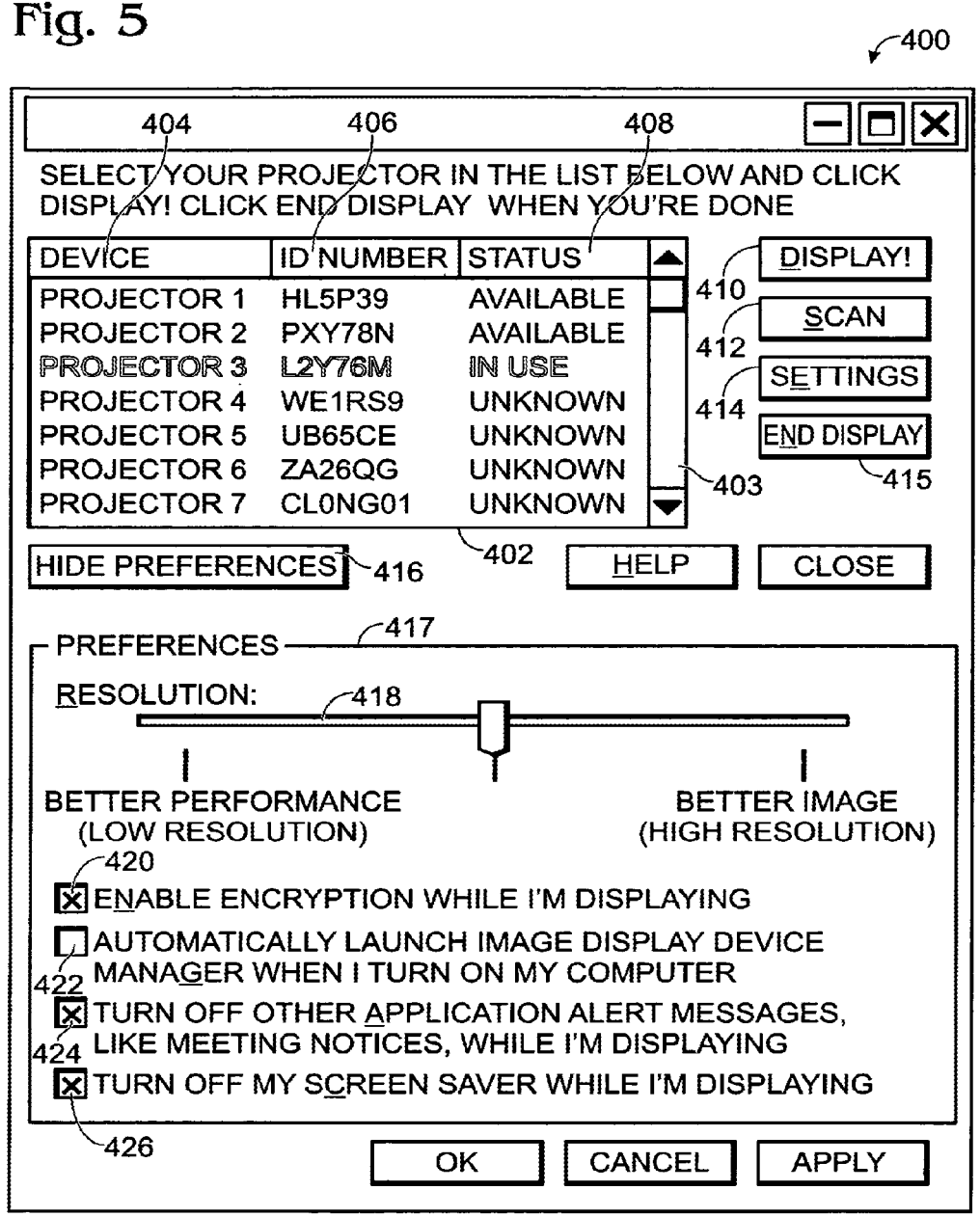
FIG. 5 is a representative exemplary user interface device selection window showing a plurality of image display devices that have been detected.

The list of image display devices may be presented to the user in any suitable format. An example of a suitable format is shown in FIG. 5 as image display device list window 400.1. Image display device list window 400 includes a listing field 402 in which all image display devices detected (shown herein as image display devices) are presented to the user. Listing field 402 may include a scroll bar 403 to allow more image display devices to be listed in the field than can be viewed in the field at one time.

The individual image display device 14 listings in listing field 402 may include any desired information regarding a image display device, and may be arranged in any suitable manner. For example, listing field 402 may include an identification name column 404 in which each image display device is identified to the user by its common name. Listing field 402 may also have an identification number column 406 in which the serial number or other identification number of each detected image display device 14 is listed.

Additionally, listing field 402 may have a status column 408 that gives information regarding the status of each detected image display device. For example, if an image display device 14 is on the same WLAN as the user's computer, the user's computer may detect whether the image display device 14 is currently being used by another user, or whether the image display device 14 is available for use. Where a selected image display device 14 is currently in use, the user interface program may indicate this by showing the words "in use" in the status column next to the selected image display device. Likewise, where the selected image display device 14 is not in use, the word "available" may be shown in the status column. On the other hand, where the selected image display device 14 is on a different WLAN than the one to which the user's computer is currently connected, the word "unknown" may be shown in the status column next to the selected image display device, indicating that the user interface program is unable to determine the status of the selected image display device 14 at that time.

Next, image display device list window 400 may include one or more buttons to allow a user to perform specific operations within the user interface program. For example, image display device list window 400 may include a "display" button 410. A user may present a presentation via a desired image display device 14 by first selecting an image display device in listing field 402, and then selecting the "display" button 410. This operation is described in more detail below. Image display device list window 400 may also include a "scan" button 412 which may be selected by a user to scan for image display devices 14 on other WLANs besides the one to which the user's computer is currently connected. Furthermore, image display device list window 400 may include other control buttons, such as a settings button 414 for changing image display device settings over the WLAN, and an "end display" button 415 that ends a display session, and that may disconnect the image source 16 from the image display device 14.

Image display device list window 400 may also be configured to allow a user to control other computer features from inside of the user interface program environment. For example, image display device list window 400 may include a preferences button 416 that may be selected to selectively reveal and hide a preferences sub-screen 417. Preferences sub-screen 417 may include such controls as a resolution control 418 that allows a user to adjust compression characteristics of the compression algorithm to balance desired speed and image quality characteristics. Preferences sub-screen 417 may also include controls allowing a user to enable encryption during displaying 420, to automatically launch the user interface program at computer start-up 422, to turn off other alert message applications during displaying 426, and to turn off screen saver programs during displaying 428.

As described above, one user selectable preference may be a selection regarding encryption of data, 420. Thus, in some embodiments, a user may selectively enable encryption of data transmitted from a user-computing device (image source) to an image display device. For example, as shown at 420, a user may select to activate or enable an encryption process for the data being sent to the image display device. Upon a user's selection of a projection device, and selection of the option for encryption, a data protection process may be activated. The data protection process may be configured to generate locked data. Locked data, as used herein, is data that is not immediately available for use by the image display device without authorized release. For example, transmitted data may not be immediately viewable or projectable by the image display device. Authorized release may include input of a password or key to unlock the locked data for presentation by the image display device.

The data protection process may include any suitable method for locking the data for immediate automatic presentation by the image display device. For example, the data protection process may include encryption of the data, password protection of the data, generation and verification of digital signatures, etc. Although in some embodiments, the data protection process may include locking an entire transmission, in other embodiments, the data protection process may simply lock an initial or test transmission which once released enables the entire transmission to be released.

Examples of the data protection process include data encryption and transmission of the encrypted data (either the entire transmission or an initial or test transmission) to the image display device. With encryption of the data, a password or key may be necessary to activate a decryption process. The decrypted data may then be "unlocked" and presented by the image display device. It should be appreciated that any suitable encryption and decryption systems and/or processes, including use of public and/or private keys, may be used, including but not limited to asymmetric key-based algorithms, symmetric key-based algorithms, etc.

In some embodiments, the data protection process may include locking the data using a password protection system. In such a system, only through input of a select password (which may be user selected, administrator selected, device selected, pre-generated, etc.) can the data be unlocked. Once unlocked, the data may be available to the image display device (e.g. available for display or presentation).

After transmission of the locked data, and receipt of the locked data by the image display device, a password or key may be required to release the locked data. A key, as used herein, may be any suitable code or password, including a numeric code, an alphanumeric code, a program, a signature, etc. For example, in some embodiments, a user may select or use a predefined code, such as a numeric code. (e.g. a six-digit code or other suitable code) to unlock the data. In some embodiments, the key may be predefined such that the key is image display device specific. In some embodiments, the key or a base key from which associated keys are derived, may be stored in memory on the image display device.

Release of the data may occur from the image source (data transmitting computing device) or from the image display device. For example, upon receipt of the data from the image source, the image display device may notify the image source that the data has been received. A user may then input a preselected and/or predefined key into the image source, which when transmitted to the image display device, unlocks the image data.

Figure 6:
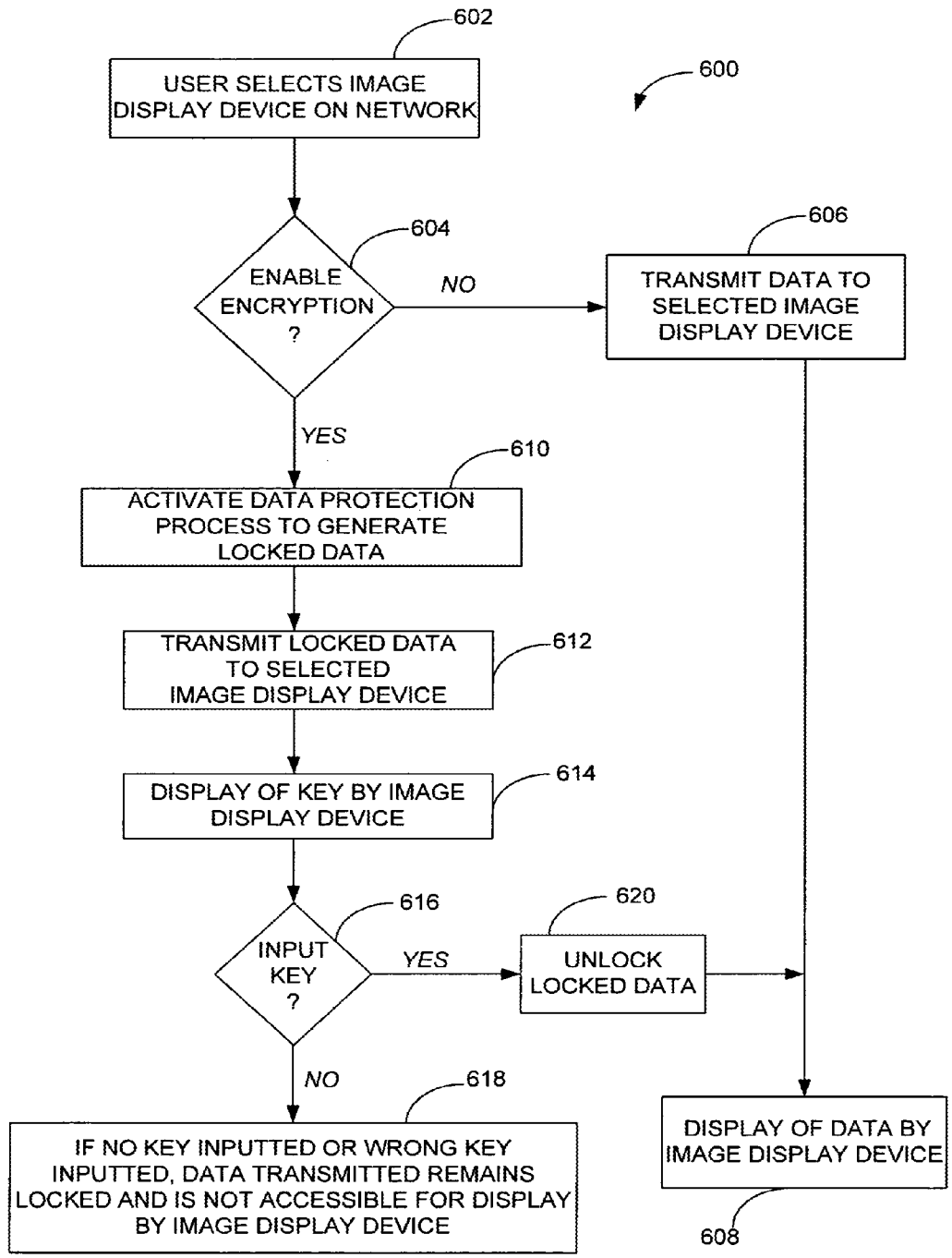
FIG. 6 is an exemplary flow chart of a method of securing data transmitted over a network to an image display device.

FIG. 6 illustrates an exemplary method 600 of securing image data transmitted from an image source to an image display device. Specifically, as illustrated at 602, a user selects a desired image display device to receive data transmitted from the user's computing device (image source). The user may then select to enable encryption at 604. In some embodiments, an administrator or other user may have preselected for enabling or not enabling encryption. If encryption is not selected, the data is transmitted to the selected image display device as shown at 608. The transmitted data may then be available for immediate display by the receiving image display device, at 608.

If encryption is selected, then a data protection process may be activated to generate locked data at 612. After locking the data in accordance with the data protection process, the locked data may be transmitted (at 614) to the selected image display device. A key may be displayed to the user by the image display device. The key may correspond to the image display device. For example, the key may be the image display device's address, name, locator, etc. In some embodiments, a key may be sent by the image display device back to the transmitting image source over the network such that the key is accessible to the user from the image source.

To release the locked data, the key may be inputted into the system, at 616. If no key is inputted or an incorrect or non-matching key in inputted, data transmitted from the image source remains locked and is not accessible for display or use by the image display device, at 618. However, if the key is identified as the correct key, the locked data is unlocked, at 620, and the data is available for display or use by the image display device at 608.

Figure 7:
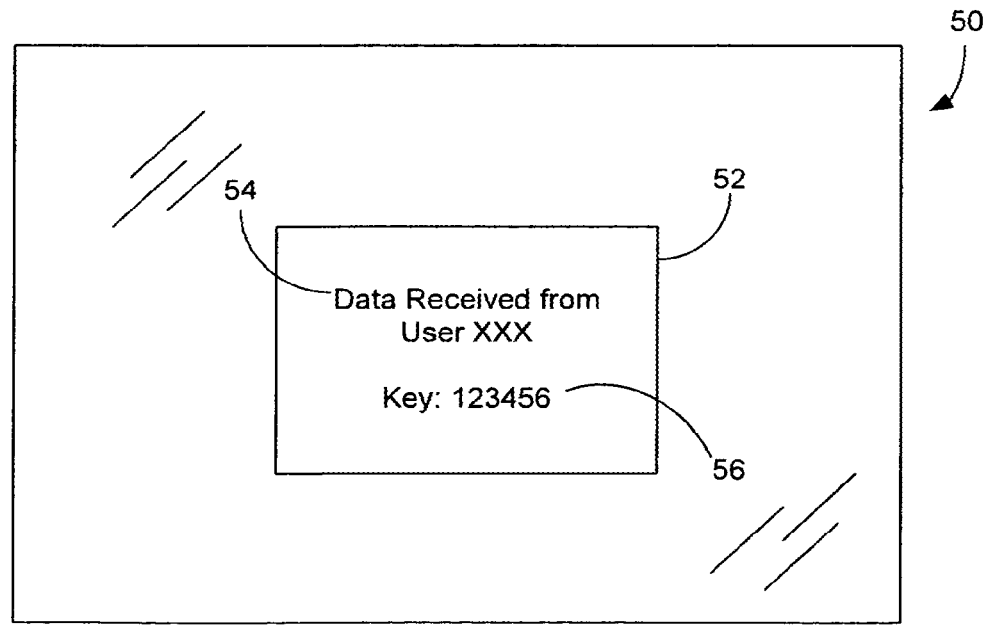
FIG. 7 is an example splashette image generated by an image display device including display of a key corresponding to the image display device that may be used to unlock data locked through a data protection process.

FIG. 7 illustrates an exemplary method of unlocking data sent from an image source. In FIG. 7, a projected image from image display device is shown at 50. The projected image may include a splash screen or splashette image 52. The splashette image may be a small or large window that appears on the display surface. For example, the splashette may be a small window viewable by a user that appears in the center of a projected display (although other locations can also be selected and are contemplated herein). The splashette may be presented during prespecified states, such as start-up/power-up, receipt of image data, power down, etc. The splashette may contain information related to the image display device. In some embodiments, the splashette may include one or more of the following fields, or combinations there of:

Name: presenter image display device name;

Unique ID: presenter unique ID (which may be derived from a MAC address);

WLAN: presenter network name;

Model: image display device model;

Version: 1.0.x.x (which may be in light gray);

IP address (which may be in light gray).

The splashette may further include information regarding receipt of image data as indicated in FIG. 7 at 54. The receipt of image data may further include the source of the transmitted image data (e.g. User XXX or Device YYY (not shown)). In some embodiments, the receipt of data from an image source may trigger the display of the splashette.

In addition to the information regarding receipt of image data, a key may be displayed by the image display device (such as in the splashette). For example, in FIG. 7, key 123456 at 56 is shown in the splashette. A user may view the key and enter the key into the networked transmitting image source. The key may operate to unlock the data such that the data transmitted by the image display device may be available to the image display device. It should be appreciated that the key may be specific to the display device, specific to the user and/or randomly generated.

Upon display of the key by the image display device, a user may input the key into the user-computing device (transmitting image source). A key that matches the selected image display device may operate to unlock the image data sent by the user to the corresponding projection device. Non-entry of a key, or improper entry of a key, will result in the image data continuing to be locked, such that the image data is not available to the image display device for display or presentation. For users transmitting an image from a room with the image display device, the user may immediately read the key and input the key into their transmitting image source. Alternatively, remote users may request the key from viewers disposed in viewing distance of the image display source and input the viewed key into their remote computing source.

In this manner, data may be protected from display and viewing by an unauthorized party. For example, such an encryption process prevents another party from viewing a user's presentation without prior authority from the user and access to the transmitting image source. Thus, an unauthorized party cannot view transmitted data without the user authorizing release of the data from the transmitting image source. By controlling the release at the transmitting source, a user can be confident that a presentation is not accidentally transmitted and presented on an unselected (or undesired) image display device.

It should be appreciated that the encryption of image data and software (discussed in more detail below) may be a 128-bit AES encryption. However other encryption may be used without departing from the scope of the disclosure. Such encryption may be similar to Secure Socket Layer (SSL) encryptions. Alternatively, other suitable methods of encryption may be used to prevent unauthorized users from viewing and/or accessing image data sent from a user computing device (image source) to a selected image display device.

Referring again to FIG. 4A, the process of selecting and sending data to an image display device is further discussed. As shown, if a user finds, at 306, that the desired image display device is in the list of discovered projection devices, the user may try to select the desired projection device. However, before allowing the user to use the projection device, the user interface program first may check at 318 to determine whether the desired image display device is available, meaning whether the image display device is both on the current WLAN and not in use by another user. If the desired image display device is available, then (referring again to FIG. 4B), the user may highlight the desired image display device and then select, at 320, the "display" button 410. This may activate the screen-scrape (or other data transfer) program, causing an image of the user's desktop to be compressed and transmitted to the image-rendering device 14 associated with the selected projection device. It should be appreciated that the above described data protection process may be activated to secure the transmission.

If the data protection process has not been activated, or the data has been unlocked, image-rendering device may render any image data and provide the rendered image to the selected image display device for display at 322. The user's desktop is displayed by the selected image display device until the user selects at 324 a "stop projecting" control (not shown), which ends the projection session and may close the user interface program. At this point, the computer's previous WLAN settings may be restored at 325.

Referring again to FIG. 4A, if the desired image display device is not determined to be "available" at 318, then it is determined at 326 whether the image display device is "in use." If the image display device is determined to be "in use", the identification of the image display device may be shown in a different color, font, size, or other appearance characteristic in listing field 402 compared to the other image display devices shown in the listing field. This indicates to the user that that particular image display device may not be selected.

If, however, it is determined at 326 that the use state of the desired image display device is unknown, this indicates that the desired image display device may be on a different WLAN than the one to which the user's computing device is currently connected. In this case, referring again to FIG. 4A the user may attempt to use the image display device by selecting the image display device and then selecting "display", as shown at 330. This may prompt the user interface program to attempt to detect other WLANs at 332. If no other WLANs are detected at 332, then an alert may be displayed to alert the user that the desired image display device is either out of range or turned off, as shown at 334. Then, the user may again examine the list of image display devices shown at 304 to select another desired image display device.

On the other hand, if other WLANs are detected at 332, then the user interface program may connect to the other WLANs to search for the selected image display device on the other WLANs. Before connecting, the user may be alerted at 336 that the current network connection will be lost while the user interface program searches for the selected projection device. At this point, the user may choose to cancel the search. If the user so chooses, the user may be directed back to the list of image display devices shown at 304 to select another desired image display device.

If the user does not choose to cancel, then the user interface program disconnects from the current WLAN and connects to other detected WLANs to locate the desired image display device. If the desired image display device cannot be found, then the desired image display device is determined at 338 either to be off or out of range, and the user may be alerted to such a condition, as indicated at 334.

If the desired image display device can be found, the user interface program next determines whether the desired image display device is "available" at 340, meaning that it is not being used by another user. If the desired image display device is in use, then the user may be alerted of its status at 342, and may then be directed to the list of image display devices shown at 304 to select another desired image display device. If, however, the desired image display device is determined to be "available", then the user's computer is connected to the image display device via the image-rendering device 14 associated with the computing device, and the user may display a presentation as described above for steps 322, 324 and 325.

Where multiple image display devices are connected to a single LAN (or WAN, WLAN, or any other type of network) software and/or firmware on each image-rendering device and/or image display device may be updated over the network from a single computer. For example, the user interface program may have an "update" functionality that manages software and/or firmware upgrades. The "update" or "upgrade" functionality may detect all image display devices and image-rendering devices on the current network that are turned on and available. The "update" or "upgrade" functionality may also detect various aspects of the status of the image display devices, including, but not limited to, the version number of any software and/or firmware stored on the image display devices.

The user interface program may be configured to display the list of the detected image display devices to a user. This list may be displayed in any suitable manner, and may contain any desired information regarding the identity and status of each detected image display devices. FIG. 8 shows an example of a suitable update interface window generally at 500. Update interface window 500 includes a listing field 502 containing a list of all image display devices detected on the current network, arranged by name in a column 504. Alternatively, the image display devices may be identified by serial number, conference room name or number, etc.

Listing field 502 also may show a version number (or other identifier) of the firmware and/or software currently installed on each detected projection device, as indicated at 506. The depicted listing field 502 shows only a firmware version for each projection device. However, it will be appreciated that the listing field may show a software version, or a both a software and a firmware version. Additionally, listing field 502 may show whether a detected image display device is in use, as indicated at 508.

Next, to update or upgrade the firmware and/or software, a user may first select the image display devices that the user desires to update via a checkbox 510 (or other selection device) associated with each listed image display device (image display devices in illustrated example). For example, in the depicted embodiment, the user may wish to update only those image display devices which are running the oldest firmware version. Thus, the user may select image display devices 1, 2, 6 and 7 by checking the box next to each of these image display devices. The user is not able to select image display device 4 because it is indicated to be in use. Next, the user may simply select the update button 512 to begin updating the firmware on each listed image display device. Alternatively, a user may cancel the updating process simply by selecting a "cancel" button 514. After the updating process has been completed, the user interface program may update the list shown in FIG. 8 by indicating whether the update was successful or unsuccessful under status column 508 (not shown).

An encryption process for the software upgrades, similar to the process shown and discussed in relationship to transmission of data may be available in some embodiments. Such an encryption process may be automatically actuated or user-actuated. For example, the software upgrades may be encrypted such that upon selection of one or more image display devices to be updated, a data protection process is activated to lock the software as it is transmitted to the selected image display device.

For example, a process similar to the process shown in FIG. 6 may be used to secure transmission of the software upgrade over the network to an image display device or an associated image-rendering device. The software upgrade acts as the "data" shown in FIG. 6 and "data", as used herein, should be considered to include upgrades. Specifically, a user may select one or more image display devices on the network for transmission of an upgrade or other software or firmware application or program. For ease of description, upgrade, as used herein, includes any software or firmware updates or software or firmware upgrades, new software or firmware applications or programs, corrective software or firmware applications or programs, etc.

In using the data protection process for the upgrades, once a user selects one or more image display devices for updating, the user, in some embodiments, may select to enable encryption. In some embodiments, the enabling of encryption may be preset by a different user, administrator, the upgrade package, program or application, or a related program or application, etc. such that the user has no choice but to enable the encryption. By enabling the encryption, a data protection process may be used to lock the upgrade during transmission. The locked upgrade may then be transmitted to the one or more selected image display devices.

In some embodiments, as discussed in relationship with the encryption of data, selected image display devices may display a key, such as a user-readable code, e.g. an alphanumeric, a numeric or lettered code, etc. A user may input the code into the user-computing device. If the key matches the selected image display device, the upgrade may be unlocked and the image display device may continue to load or complete loading of the upgrade on the selected image display device. If no key is inputted or an incorrect key is inputted, the upgrade may be rejected from the selected image display devices and not loaded onto the selected image display devices. Such a process enables only authorized parties to load software upgrades on the image display devices and associated image-rendering devices.

In some embodiments, the data protection process for the upgrades (or data) may include a digital code or electronic code. For example, the data protection process may include a request of a digital signature from the user, or may include an embedded digital signature. Upon verification of the digital signature (which acts as the key in FIG. 6), uploading of the upgrade may occur. Alternatively, when the digital signature is embedded in the upgrade, the device may automatically detect and verify the digital signature.

Such a secure software upgrade process, whereby the software upgrade is encrypted and may be unlocked through signature verification or a match code process, may prevent third parties from downloading or accessing software upgrades. For example, such a process may prevent man-in-the-middle attacks, whereby a third party accesses the upgrades or other data during the transmission process.

In some embodiments, the encryption process may further be used to prevent loading of non-proprietary software on the associated device. By providing a signature specific to the image display device (or image-rendering device), a manufacturer may be able to limit the types of software that may be successfully loaded on the device. For example, only software having a signature or code that may be verified as corresponding to the image display device may be available for download onto the image display device.

The encryption process may also be used to prevent the unauthorized download of software from the image-rendering device or image display device. By attaching a digital signature, that requires verification (or input of a release code) to access the software, a user may be restricted access to the software for the purposes of unauthorized downloading of the software specific to an image display device.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An apparatus comprising:
a processor coupled to memory, wherein the memory includes instructions executable by the processor to perform a method comprising:
selecting an image display device on a network to display a presentation, the presentation comprising content configured to be displayed;
encrypting the presentation to lock the content and generate a key, wherein the content as locked is not displayable by the image display device, wherein the key is displayable by the image display device;
transmitting the presentation as encrypted to the image display device;
receiving a key input corresponding to the key;
determining that the key input matches the image display device; and
causing the content to become displayable by the image display device based on determining that the key input matches the image display device.

2. The apparatus of claim 1, wherein the key is specific to one of the image display device and a user providing the key input via the image display device.

3. The apparatus of claim 1, wherein the key is displayed as an alphanumeric key in a splashette projected by the image display device.

4. The apparatus of claim 1, wherein the key input is entered by a user disposed in viewing distance of the image display device displaying the key.

5. The apparatus of claim 4, wherein the user enters the key input into the image display device.

6. The apparatus of claim 1, wherein encrypting the presentation comprises presenting, before sending, a plurality of encryption options including an option to not encrypt the presentation.

7. The apparatus of claim 1, wherein the image display device comprises a projector of a plurality of projectors coupled to the network.

8. The apparatus of claim 1, wherein the key comprises information relating to identity of the image display device.

9. The apparatus of claim 1, wherein causing the locked content to become displayable on the image display device comprises a decryption process performed by the processor.

10. The apparatus of claim 1, wherein causing the locked content to become displayable on the image display device comprises enabling a decryption process to be performed by the image display device.

11. An article of manufacture comprising:
a non-transitory machine-readable medium having machine-executable instructions stored thereon to perform a method, the method comprising:
selecting an image display device on a network to display a presentation, the presentation comprising content configured to be displayed;
encrypting the presentation to lock the content and generate a key, wherein the content as locked is not displayable by the image display device, wherein the key is displayable by the image display device;
transmitting the presentation as encrypted to the image display device;
receiving a key input corresponding to the key;
determining that the key input matches the image display device; and
causing the content to become displayable by the image display device based on determining that the key input matches the image display device.

12. An apparatus comprising:
selection device that selects an image display device on a network to display a presentation, the presentation comprising content configured to be displayed;
encryption device that encrypts the presentation to lock the content and generate a key, wherein the content as locked is not displayable by the image display device, wherein the key is displayable by the image display device;
a transmission device that transmits the presentation as encrypted to the image display device;
receiving device that receives, a key input corresponding to the key;
determination unit that determines whether the key input matches the image display device; and
display device that causes the content to become displayable by the image display device based on determining that the key input matches the image display device.

* * * * *